United States Patent
Shayne et al.

(10) Patent No.: US 12,315,210 B2
(45) Date of Patent: May 27, 2025

(54) CAMERA BLINDSPOT ANALYSIS

(71) Applicant: ALARM.COM INCORPORATED, Tysons, VA (US)

(72) Inventors: Ethan Shayne, Herndon, VA (US); Donald Gerard Madden, Columbia, MD (US); Allison Beach, Leesburg, VA (US); Narayanan Ramanathan, Chantilly, VA (US); Daniel Todd Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 286 days.

(21) Appl. No.: 17/962,108

(22) Filed: Oct. 7, 2022

(65) Prior Publication Data

US 2023/0110877 A1    Apr. 13, 2023

Related U.S. Application Data

(60) Provisional application No. 63/254,736, filed on Oct. 12, 2021.

(51) Int. Cl.
| | |
|---|---|
| *G06V 10/25* | (2022.01) |
| *G06T 7/246* | (2017.01) |
| *G08B 13/196* | (2006.01) |
| *G06V 20/40* | (2022.01) |

(52) U.S. Cl.
CPC .............. *G06V 10/25* (2022.01); *G06T 7/248* (2017.01); *G08B 13/19613* (2013.01); *G06V 20/41* (2022.01)

(58) Field of Classification Search
CPC ......... H04N 7/186; G06T 7/248; G06T 7/254; G06V 10/225; G06V 40/23; G06V 10/774; G06V 20/52
See application file for complete search history.

(56) References Cited

U.S. PATENT DOCUMENTS

2022/0129841 A1* 4/2022 Gutke .............. G08B 13/19602
2022/0398750 A1* 12/2022 Kerzner ................ G06V 10/62

* cited by examiner

*Primary Examiner* — Richard T Torrente
(74) *Attorney, Agent, or Firm* — Fish & Richardson P.C.

(57) ABSTRACT

Methods, systems, and apparatus, including computer programs encoded on computer storage media, for detecting packages delivering in the camera's blindspot. One of the methods includes detecting, using one or more images captured by a camera at a property, movement in an area of interest i) at the property, ii) that is included in a field of view of the camera and iii) was generated using historical data for packages delivered to the property; determining, using the detected movement in the area of interest, that a package was likely delivered; and in response to determining that the package was likely delivered, performing one or more automated actions for the package.

20 Claims, 3 Drawing Sheets

CAMERA BLINDSPOT ANALYSIS

CROSS-REFERENCE TO RELATED APPLICATION

This application claims the benefit of U.S. Provisional Application No. 63/254,736, filed Oct. 12, 2021, the contents of which are incorporated by reference herein.

TECHNICAL FIELD

This disclosure application relates generally to camera object detection.

BACKGROUND

Many properties are equipped with monitoring systems that include sensors and connected system components. Monitoring systems can receive and analyze data from sensors that are internal and external to the property. Some monitoring systems include cameras. Delivery services can deliver packages to a property. In some cases, packages may be delivered to locations of a property that are not within a field of view of a camera installed at the property.

SUMMARY

Techniques are described for monitoring packages delivered to camera blindspots. Video can be captured by a camera installed at a property. For example, the camera may be a doorbell camera that is installed at a door of a property and that can capture images of a package delivered to the property. The disclosed techniques can be used to build a model of the package delivery scene, including identifying blindspots of installed cameras at the property. The model of the delivery scene can then be used to detect deliveries to blindspots and to monitor packages that have been delivered to blindspots in order to guard against damage and theft.

In many residential installations, a camera may be built into a doorbell or mounted near a door. Installed cameras may have a limited and/or fixed field of view and therefore might not be able to capture images of a package after the package has been delivered. Additionally, the appearance and structure of the package might not be clear from the view of an installed camera. Thus, an installed camera likely has blindspots. This has particular implications for package delivery detection, where a package may be delivered or removed without being detected by the camera.

The disclosed techniques can be used to monitor and guard packages that have been delivered to blindspots. For example, when a blindspot delivery is detected, the camera may be adjusted in order to monitor the package. In some examples, additional cameras can be deployed to monitor the package. In some examples, the camera can estimate a location of the package and can generate an area of interest around the estimated location. When a person approaches or enters the area of interest, the camera can perform an action such as sending a notification to a resident of the property or activating a warning signal to warn the person not to approach the package.

Other implementations of this aspect include corresponding systems, apparatus, and computer programs recorded on computer storage devices, each configured to perform the operations of the methods.

In general, one innovative aspect of the subject matter described in this specification can be embodied in methods that include the actions of detecting, using one or more images captured by a camera at a property, movement in an area of interest i) at the property, ii) that is included in a field of view of the camera and iii) was generated using historical data for packages delivered to the property; determining, using the detected movement in the area of interest, that a package was likely delivered; and in response to determining that the package was likely delivered, performing one or more automated actions for the package.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, the method includes determining that a first package was delivered to a location not depicted in the one or more images captured by the camera at the property; and in response to determining that the first package was likely delivered to the location not depicted in the one or more images captured by the camera at the property, generating the area of interest in the field of view of the camera.

In some implementations, the method includes determining that the package was likely delivered to the location not depicted in the one or more images captured by the camera at the property uses one or more first images captured by the camera.

In some implementations, the location not depicted in the one or more images captured by the camera comprises a location outside the field of view of the camera or an occluded location behind one or more objects depicted in at least the one or more images captured by the camera.

In some implementations, the method includes, performing the one or more automated actions for the package comprises, in response to determining that the package was likely delivered, providing, to a device for an occupant of the property, instructions to cause the device to present a notification about the package.

In some implementations, the method includes performing the one or more automated actions for the package comprises, in response to determining that the package was likely delivered, sending, to the camera, instructions to cause the camera to capture, using a second field of view, one or more second images that depict a location at which the package was likely delivered.

In some implementations, the method includes performing the one or more automated actions for the package comprises: detecting, using one or more second images captured by the camera, second movement in the area of interest; and in response to determining that the package was likely delivered and detecting the second movement in the area of interest, causing presentation of a warning.

In some implementations, the method includes detecting the movement in the area of interest comprises detecting, using one or more first images captured by the camera that depict the package, the movement in the area of interest; and determining, using the detected movement in the area of interest, that the package was likely delivered comprises determining, using the one or more first images from which the movement in the area of interest was detected and one or more second images a) captured by the camera after the one or more first images b) that do not depict the package, that the package was likely delivered.

In some implementations, the method includes detecting the movement in the area of interest comprises detecting, using the one or more images captured by the camera, the movement of a person or a robot in the area of interest.

In some implementations, the method includes detecting the movement in the area of interest comprises detecting, using the one or more images captured by the camera, the movement in the area of interest around an area at which the historical data indicates one or more packages were previously delivered.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Figure 1:
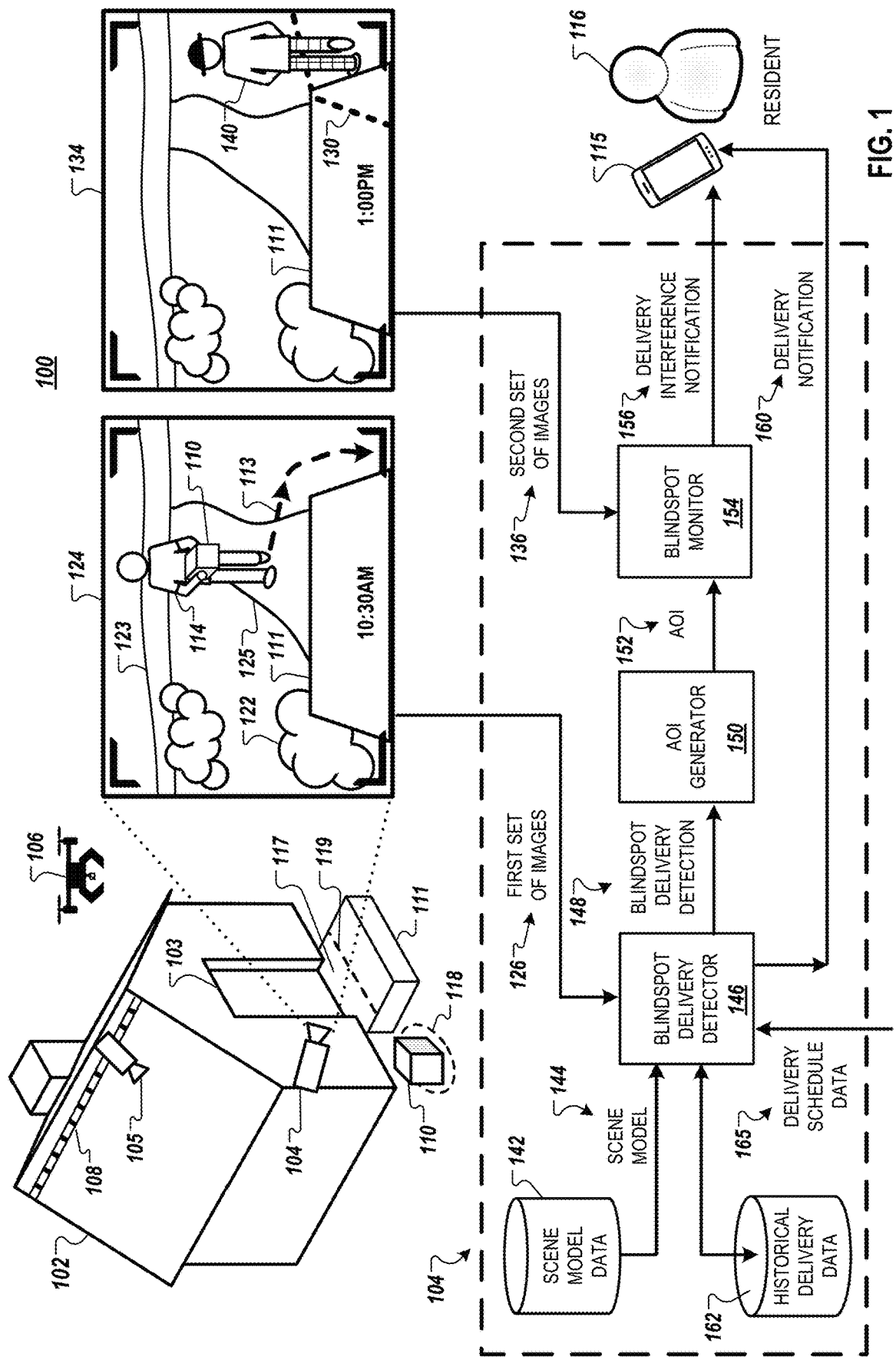
FIG. 1 illustrates an example system for monitoring packages delivered to camera blindspots.

FIG. 1 is a diagram illustrating an example environment 100 for monitoring packages delivered to camera blindspots. The environment 100 includes a camera 104 installed at a property 102. The property 102 can be a home, another residence, a place of business, a public space, or another facility that is monitored by a monitoring system that implements one or more components from the environment 100.

A camera 104 is installed at the property 102. The camera 104 can be, for example, a surveillance camera installed at the property 102. The camera 104 is installed external to the property 102. The camera 104 is installed near a door 103, facing a yard of the property 102. However, the camera 104 may instead be installed internal to the property 102. For example, the camera 104 may be inside the property 102 next to a window facing outwards with a clear view of a year of the property 102.

The camera 104 can be a component of a monitoring system, e.g., a doorbell camera, or another appropriate type of system. In some examples, the camera 104 can be configured to record continuously. In some examples, the camera 104 can be configured to record at designated times, such as on demand, when triggered by another sensor of the environment 100, or when triggered by detection of object motion within a field of view of the camera 104.

The camera 104 can capture visual images of scenes at the property within the field of view. The camera 104 may perform video analysis on captured images. Video analysis can include, for example, event detection, object detection, and object classification. In some examples, the camera 104 can send image data to a computing system, e.g., a monitoring server, and the monitoring server can perform video analysis on the captured images. In some examples, the camera 104 and the monitoring server can each perform video analysis on the captured images. For example, the camera 104 can perform object detection, while the monitoring server can perform object classification.

To support communications with computing devices such as a monitoring server or a mobile device 115, the camera 104 can include a communications module, such as a modem, transceiver, modulator, or other hardware or software configured to enable the camera 104 to communicate electronic data to the monitoring server. The camera 104 can send data over a long-range data link. The long-range data link can include any combination of wired and wireless data networks. For example, the monitoring server can exchange information with the camera 104 through a wide-area-network (WAN), a broadband interne connection, a cellular telephony network, a wireless data network, a cable connection, a digital subscriber line (DSL), a satellite connection, or other electronic means for data transmission. In some implementations, the long-range data link between a monitoring server and the camera 104 is a secure data link (e.g., a virtual private network) such that the data exchanged between the monitoring server and the camera 104 is encoded to protect against interception by an adverse third party.

FIG. 1 illustrates a package 110 that has been delivered to the property 102 by a delivery person 114. The porch 111 is within the field of view of the camera 104. A resident 116 of the property may be located at the property 102 or at a location away from the property 102. The delivery person 114 delivers the package 110 to a location 118 at the property 102 that is outside of the field of view of the camera 104.

The example illustrated in FIG. 1 includes one camera 104 and one package 110. However, some examples can include additional cameras and/or packages. The package 110 can be, for example, a package ordered by the resident 116 from a delivery service, such as a bag of food or a box of consumer products. In some examples, the package 110 can be a package sent to the resident 116 by another person, such as a box of gifts sent to the resident 116 through a mail service.

The delivery person 114 may be an employee or contractor of a delivery service organization. The delivery service organization can be, for example, an internet sales company, a shipping company, or a postal service. The delivery person 114 is a person assigned to deliver the package 110 to the property 102.

The resident 116 is associated with the mobile device 115. The mobile device 115 can be, for example, a smart phone or tablet computer. The mobile device 115 includes a communication module for communicating over one or more wireless networks. For example, the mobile device 115 can each connect to the internet using a cellular or Wi-Fi network. The mobile device 115 can each communicate wirelessly with, for example, a GPS satellite system, the monitoring server, the camera 104, and other computing devices. The mobile device 115 can receive and send text messages, emails, and telephone calls, and can communicate with the camera 104 through a mobile application.

In some examples, in addition to or instead of a delivery person 114, the package 110 can be delivered by a robot For example, the package 110 can be delivered by an aerial robot or a ground transportation robot. The robot may be owned and/or operated by a delivery service and can navigate to the property 102 based on automated control technology and/or user input control provided by a user.

The camera 104 captures a first set of images 126. The first set of images 126 shows the porch 111 from the perspective of the camera 104. The first set of images 126 can include images captured by the camera 104 and generated from any appropriate type of light. For example, the images can be generated from any combination of visible light, IR light, or UV light. The images can also be generated from RADAR, LIDAR, and/or microwave imaging. The first set of images 126 can include any combination of still images, recorded video, or live-streamed video.

The first set of images 126 includes image 124. The image 124 includes a depiction of the porch 111 and a shrub 122. The image 124 also includes a depiction of the delivery person 114 carrying the package 110.

The camera 104 can perform video analysis including, e.g., human detection, recognition, and tracking, object detection, recognition, and tracking, background change detection, event detection, etc. In the example of FIG. 1, the camera 104 determines, based on analyzing the first set of images 126, that the delivery person 114 carries the package 110 along the path 113. The path 113 leads outside of the field of view of the camera 104. In some examples, the camera 104 may determine that the first set of images 126 depicts the delivery person 114 approaching the property 102 with the package 110 and departing from the property 102 without the package 110.

In some examples, the camera 104 can perform an action to assist the delivery person in delivering the package 110 to a location that is not a blindspot of the camera 104. For example, the camera 104 may predict that the delivery person 114 is going to deliver the package 110 to a blindspot based on determining that the delivery person 114 departs from the walkway 125 along the path 113. Based on predicting that the delivery person 114 is going to deliver the package 110 to a blindspot, the camera 104 can activate one or more signals to guide the delivery person 114 to a location within the field of view of the camera 104.

As an example, a light may be located near the porch 111. The camera 104 can transmit a command to the light that causes the light to illuminate a location where the package 110 should be delivered. In another example, an audio speaker may be located near the porch 111. The camera 104 can transmit a command to the audio speaker that causes the audio speaker to broadcast sound such as a voice that instructs the person 140 where to deliver the package 110. In some examples, the package 110 may be delivered by a robot, and the camera 104 can transmit wireless commands to the robot indicating a location where the package 110 should be delivered.

In some examples, the camera 104 can analyze the first set of images 126 to determine a time of a delivery event. For example, the camera 104 can identify images included in the first set of images 126 that depict likely delivery events, e.g., images of the delivery person 114 approaching the property 102 with the package 110. Based on timestamps of the first set of images 126 that show a likely delivery event, the camera 104 can determine a time when the package 110 was delivered to the property 102.

The camera 104 includes a scene model database 142, a blindspot delivery detector 146, an area of interest (AOI) generator 150, and a blindspot monitor 154. The scene model database 142 stores a spatial model of one or more scenes where packages may be delivered at the property 102. For example, the scene model database 142 can store a model of a scene or scenes including the porch 111. In some examples, the scene model database 142 can build the scene model 144 using images captured by multiple installed cameras with overlapping field of view, e.g., the camera 104 and any other cameras at the property that have a field of view that includes the porch 111. Geometric relationships between the multiple cameras can be stored by the monitoring server. The geometric relationships can be determined using image analysis, based on programmed installation positions of the cameras, or both. In some examples, the scene model database 142 can store spatial models of scenes at multiple properties.

In some examples, the scene model 144 can be developed during a training or setup phase of the system. For example, a user can perform a survey by using a camera, e.g., a camera that is part of a mobile device, to capture video or still images of scenes at the property 102 where packages are likely to be delivered. The user can provide the captured images to the server 120. The server can store the captured images in the scene model database 142 and can use the captured images to build the scene model 144.

In some examples, the scene model database 142 can generate, build, or improve the scene model 144 over time. The scene model database 142 can build the model of the scene using images captured by the camera 104 and by any other cameras installed at the property 102.

In some examples, the scene model database 142 can be augmented using delivery images. Delivery images can be images of a package that are captured by a delivery person after delivering the package to a property. For example, after placing the package 110 next to the porch 111, the delivery person 114 may use a mobile device to capture an image of the package 110. The delivery person 114 uploads the image, using a mobile application, to a computing system that provides the image to the resident, e.g., through an email, text message, or push notification. The delivery images can be forwarded to the camera 104 or can be intercepted by the camera 104 for use in updating the scene model database 142.

Delivery images can augment the scene model database 142 and improve accuracy of the 3D model of the area around the porch 111. Since the delivery images are likely not captured from the same perspective view as the camera 104, the delivery image can provide an alternate view of the area around the porch 111. In some examples, the delivery can provide a view that may include blindspots of the camera 104. By combining data from the delivery images with data from images captured by the camera 104, the blindspots can be identified in the scene model 144.

The scene model database 142 can store data indicating an estimation of the relative orientation of the ground plane including pixels of images captured by the camera 104 that correspond to the ground. The camera 104 can learn which pixels correspond to the ground, e.g., using machine learning methods. The monitoring server can analyze images captured by the camera 104 showing people, animals, and vehicles traversing over the ground. Based on analyzing the images, the monitoring server can identify the ground plane. Identifying the ground plane can enable the monitoring server to estimate the planar geometry of the scene. For example, the monitoring server can assume that the porch 111 is part of the ground plane of the scene and has a planar shape.

The scene model database 142 can store data indicating estimated locations of occlusions within the field of view of the camera 104. An occlusion can be an area that an object blocks the camera 104 from view. For example, an area behind the porch 111 and an area behind the shrub 122 can both be occlusion areas. In some examples, the camera 104 can identify occlusions based on analyzing camera images over time. For example, the camera 104 can analyze images of a person stepping on to and/or off of the porch 111 in order to identify occlusion areas in the field of view. In an example, the camera 104 can determine that a first foot of a person is not visible to the camera when the person steps on to the porch 111 with a second foot. Thus, the camera 104 can determine that an occlusion area exists behind the edge of the porch 111. The scene model database 142 can store data labeling the identified occlusion areas as blindspots. In another example, the camera 104 can analyze images of people crossing behind an obstruction such as the shrub. The camera 104 can determine that there is an occlusion area behind the shrub 122, and can label the occlusion area as a blindspot in the scene model 144.

In some implementations, upon installation, the system may have a training phase. The training phase can be used to generate scene model data for storage in the scene model database 142, historical delivery data for storage in the historical delivery database 162, or both.

In some examples, the training phase may be a period of multiple days or weeks. During the training phase, the camera can obtain images of all package deliveries to the property 102. The camera can store paths taken by delivery personnel. The camera can also store locations of packages that are delivered during the training phase. In some examples, in addition to or instead of the training phase, the camera 104 can continuously store record and store delivery paths and delivery locations while in operation. The camera can analyze all deliveries, or a selection of deliveries. In some examples, the camera 104 can continue to update the scene model database and/or the historical delivery database 162 after completion of the training phase. Thus, accuracy of the camera 104 can continuously improve over time while in operation.

The blindspot delivery detector 146 compares the first set of images 126 to the scene model 144 to determine if the package 110 was delivered to a blindspot of the camera 104. In some examples, the blindspot delivery detector 146 can select a version of the scene model 144 based on environmental conditions at the property 102. For example, the scene model database 142 can store scene models that represent the scene at various times of day, seasons of year, precipitation conditions, etc. The blindspot delivery detector 146 can select a particular version of the scene model 144 that most closely matches the current date, time, and/or weather conditions. In some examples, the scene model database 142 can store scene models for multiple properties, and the blindspot delivery detector 146 can select the scene model 144 for the particular property 102.

The scene model 144 can include landmarks within view of the camera 104. The landmarks can have a set of precomputed feature descriptors and/or precomputed three-dimensional poses within the scene. In some cases, the feature descriptors and poses can be learned over time using machine learning processes. In some cases, the features descriptors and poses can be measured or computed during a setup and training phase of the system. The blindspot delivery detector 146 can use the landmarks to match the first set of images 126 to the scene model 144. Example landmarks can include, for example, edges and corners of the porch 111, edges and corners of the door 103, etc.

In some examples, the camera 104 might not be able to determine, based on image analysis, whether or not a person in an image is carrying a package. For example, the delivery person 114 may be facing the camera 104 when approaching the property 102, but may have his or her back to the camera 104 when departing from the property 102. In some examples, the package 110 may be too small for the camera 104 to detect in the first set of images 126. The camera 104 can be operable to perform blindspot delivery detection whether or not the package 110 is ever visible to the camera 104. In some examples, the camera 104 can perform blindspot delivery detection based on image analysis of images of the delivery person 114 and/or a vehicle operated by the delivery person 114. In some examples, the camera 104 can perform blindspot delivery detection based on delivery schedule data 165 and/or historical delivery database 162.

The blindspot delivery detector 146 can determine that a blindspot delivery has occurred based on analysis of images of the delivery person 114 and/or images of a vehicle operated by the delivery person 114. The camera 104 can be trained to perform image analysis to identify vehicles, uniforms, and logos associated with delivery services. For example, the camera 104 can be trained to identify vehicles, uniforms, and/or logos associated with a postal service such as the United States Postal Service (USPS). The camera 104 can be trained, e.g., using machine learning methods.

The camera 104 can determine that the first set of images 126 depicts a USPS truck, and a person approaching the property 102 wearing a USPS uniform. Thus, the camera 104 can determine a high likelihood that a delivery is in progress. The camera 104 can track the person as the person approaches the property 102 and departs from the property 102. Based on the tracked movement of the person, the camera 104 can determine a likely location where the person delivered the package.

The blindspot delivery detector 146 can determine that a blindspot delivery has occurred based on external data such as delivery schedule data 165. For example, the camera 104 can receive data indicating a delivery schedule for the property 102. The delivery schedule data 165 can include schedule data for one or more expected deliveries at the property. For example, the delivery schedule data 165 can include data indicating that a first delivery from the USPS is expected between 10 am and 12 pm and that a second delivery from FedEx is expected between 1 pm and 3 pm. The first set of images 126 is captured around 10:30 am. The blindspot delivery detector 146 can therefore determine, based on the delivery schedule data 165 and the timestamps of the first set of images 126, that the delivery person 114 approaching the property 102 is likely executing the first delivery from the USPS. The blindspot delivery detector 146 can then determine that a blindspot delivery has occurred based on tracking movement of the delivery person 114 along the path 113.

In some examples, the delivery schedule data can be provided to the camera from a device associated with the resident 116. For example, the mobile device 115 may receive, from a delivery service, a text message or email indicating an expected delivery time for the first delivery. In some examples, the mobile device 115 can be configured to forward the text message or email to the camera 104. In some examples, the camera 104 can be configured to intercept the text message or email that is sent to the mobile device 115.

In some examples, the blindspot delivery detector 146 can determine that the package 110 has been delivered to a blindspot based on historical delivery data. For example, a historical delivery database 162 can store data indicating historical package delivery locations. The historical package delivery locations can be determined, for example, based on historical camera image data and user feedback.

As an example, the blindspot delivery detector 146 may determine, based on camera image data, that a package has been delivered to the location 118 at the property 102. The blindspot delivery detector 146 can then provide a delivery notification 160 to the resident 116. In some examples, the delivery notification 160 can indicate an estimated delivery location of the package. For example, the delivery notification 160 can include text stating that the package has been delivered to the location 118, which may be described as being on the ground on the southwest side of the porch 111.

In some examples, the delivery notification 160 can include a request for feedback on the accuracy of the estimated delivery location. For example, the delivery notification 160 can cause the mobile device 115 to display text asking if the estimated delivery location is accurate. The resident 116 can provide information, e.g., through a user interface of the mobile device 115, indicating whether the estimated delivery location is accurate or inaccurate. If the resident 116 indicates that the estimated delivery location is inaccurate, the resident 116 can provide information to the camera 104 indicating an actual delivery location of the package. In some examples, the resident can provide information to the camera 104 indicating the actual delivery location of the package by capturing an image of the package, e.g., using a camera of the mobile device 115. The photograph can be provided to the camera 104, e.g., by being uploaded through a mobile application operating on the mobile device 115. The camera 104 can update the historical delivery database 162 using the feedback received from the resident 116 indicating the actual delivery location of the package.

In some examples, the historical delivery database 162 can store a data entry for each past delivery, with each entry including a time of the delivery and a location of the delivery. The historical delivery database 162 can include data indicating whether each delivery was delivered to a blindspot or to a location that is not in a blindspot.

The blindspot delivery detector 146 can determine, based on data in the historical delivery database 162, common or frequent delivery locations that are blindspots. For example, the blindspot delivery detector 146 can determine, based on data in the historical delivery database 162, that packages are frequently delivered to the location 118.

When the delivery person 114 approaches the property 102, the blindspot delivery detector 146 can track movement of the delivery person 114 and determine that the delivery person 114 carries the package 110 along path 113 to a location that is outside of the field of view of the camera 104. The blindspot delivery detector 146 can determine, based on the scene model 144, that the path 113 leads towards the location 118. The blindspot delivery detector 146 can determine, based on the data in the historical delivery database 162, that the location 118 is a common package delivery location. The blindspot delivery detector 146 can then estimate that the package 110 has been delivered to the location 118.

In another example, an area 117 of the porch 111 that is near to the door 103 may be in a blindspot of the camera 104. The scene model 144 can include data identifying the area 117 of the porch 111 near to the door 103 as a location where, historically, packages have been delivered. The scene model 144 can also include data identifying the area 117 as a blindspot. The blindspot delivery detector 146 can determine, based on the first set of images 126, that the delivery person 114 has approached the door 103, entered the area 117 of the porch 111, and then departed from the property 102. The blindspot delivery detector can then determine, based on the delivery person 114 entering the area 117, that the delivery person 114 has delivered the package 110 to the blindspot of the area 117 of the porch 111.

In some examples, the blindspot delivery detector 146 can determine that the package 110 was delivered to a location that is outside of the field of view of the camera 104 based on the camera 104 capturing images indicating that a delivery occurred. For example, the delivery person 114 may walk through the field of view of the camera 104 at 10:30 am along path 113 and place the package 110 in the location 118 that is outside of the field of view of the camera 104.

In some examples, the blindspot delivery detector 146 can determine that the package 110 was delivered to a location that is outside of the field of view of the camera 104 based on a delivery image that is captured by the delivery person 114 and forwarded or intercepted by the camera 104. For example, the camera 104 can compare the delivery image to the scene model 144 to confirm that the package 110 was delivered to the correct property, and to determine a location within the delivery scene where the package 110 was delivered. Thus, the camera 104 can determine that a blindspot delivery occurred even in cases where the delivery person 114, the package 110, or both, are never visible camera 104.

In some cases, first set of images 126 may show the delivery person 114 carrying the package 110 while approaching the property 102, and not carrying the package 110 while retreating from the property 102. The camera 104 can analyze the first set of images 126 to determine, based on the delivery person 114 walking through the field of view of the camera 104 at 10:30 am, that a delivery event likely occurred at or near 10:30 am.

The blindspot delivery detector 146 detects that the package 110 has been delivered to a blindspot of the camera 104 based on comparing the first set of images 126 to the scene model 144. The blindspot delivery detector 146 can provide a delivery notification 160 to the mobile device 115 indicating that the package 110 was delivered to the property 102. In some examples, the delivery notification 160 can indicate that the package 110 was delivered to a blindspot of the camera 104.

The mobile device 115 receives the delivery notification 160. The delivery notification can include, for example, an electronic mail communication, a text message, a push notification, etc. The delivery notification can include information related to the delivery. The delivery notification can also include an image of the delivered package 110, e.g., at least one image of first set of images 126.

In some examples, in response to determining that a package was delivered to a blindspot of installed cameras, the camera 104 can perform one or more actions to monitor the package. For example, the camera 104 may reposition itself in order to capture images of the package. The camera 104 can reposition itself by changing its articulation and/or telescoping. In some examples, the camera 104 can change its position to see around an occlusion such as the shrub 122. For example, the camera 104 can raise, lower, or pivot.

In some examples, the environment 100 includes a second camera, e.g., roof-mounted camera 105. The roof-mounted camera 105 can be mounted to a rail 108 that runs the length of the roof of the property. For example, the rail 108 may run next to or on top of the roof ridge. In some examples, the roof-mounted camera can be mounted to a rail 108 that runs alongside a gutter or that is mounted to an eave or wall of the property 102. The roof-mounted camera 105 can move back and forth along the rail 108, e.g., as directed by the camera 104 in order to capture images of the package 110.

In some cases, the roof-mounted camera 105 can patrol along the rail 108 autonomously until the camera 105 detects an object of interest.

In some examples, the system can include one or more robots, e.g., ground or aerial robots, such as the robot 106. In some examples, the robot 106 may include data capture and recording devices. For example, the robot 106 may include one or more cameras. In some examples, the robot 106 may include a communication module. The communication module can enable the robot 106 to communicate with, for example, a GPS satellite system, the monitoring server, the camera 104, other robots, and other devices, e.g., the mobile device 115. The communication module can be a wireless communication module that allows the robot 106 to communicate wirelessly. The camera 104 can transmit an instruction that causes the robot 106 to maneuver to a position where the mounted cameras can capture images of the package 110.

In some examples, the camera 104 can direct the roof-mounted camera 105, the robot 106, or both, to capture images of areas where deliveries are likely to occur, e.g., based on data stored in the historical delivery database 162. In some examples, the camera 104 can direct the roof-mounted camera 105 and/or the robot 106 to follow a target that the camera 104 determines is heading in the direction of a blindspot. For example, when the delivery person 114 departs from walkway 125 along path 113, the camera 104 can determine that the delivery person 114 is likely heading out of the field of view of the camera 104. The camera 104 can thus transmit instructions to at least one of the roof-mounted camera 105 or the robot 106 to track the delivery person. In some examples, upon determining that the package 110 has been delivered to a blindspot, the camera 104 can direct the roof-mounted camera 105, the robot 106, or both to monitor the package 110 until the package 110 is retrieved, e.g., by the resident 116. In some examples, images captured by the roof-mounted camera 105 and images captured by the robot 106 are transmitted to the camera 104 for image analysis and blindspot delivery detection.

The blindspot delivery detector 146 can output data indicating the blindspot delivery detection 148 to the AOI generator 150. The data indicating the blindspot delivery detection 148 can include, for example, a determination that a blindspot delivery has occurred, an estimated delivery location, a time of delivery, a size of the package, etc. In some examples, the blindspot delivery detection 148 can include a confidence value associated with the determination that the blindspot delivery has occurred and a confidence value associated with the estimated delivery location.

For example, the blindspot delivery detector 146 may determine a higher confidence value for the determination that the blindspot delivery has occurred based on camera image data showing the delivery person 114 carrying the package 110 while approaching the property 102, and not carrying the package 110 while departing from the property 102. The blindspot delivery detector 146 may determine a lower confidence value based on the package 110 not ever being visible to the camera 104.

The AOI generator 150 generates an AOI 152 based on the blindspot delivery detection 148. The AOI 152 is an area that is designated for the camera 104 to monitor. For example, the AOI 152 can include a guard perimeter around the estimated location of the package. The camera 104 can track movement in to and out of the guard perimeter in order to monitor the package.

In some examples, the AOI generator 150 can store pre-generated AOIs 152. For example, the scene model 144 can include data identifying the area 117 of the porch 111 as a blindspot. The AOI generator 150 can store a pre-generated AOI for guarding packages that are delivered to the area 117. The pre-generated AOI can be bounded by boundary 119. When the camera 104 determines that a package has been delivered to the area 117, the AOI generator 150 can generate an AOI 152 that includes a virtual line crossing in the camera field of view, where the virtual line crossing corresponds to the boundary 119.

In some examples, the AOI generator 150 can generate a custom AOI based on the blindspot delivery detection. For example, the AOI generator 150 may generate a larger AOI 152 for monitoring a larger package, and a smaller AOI 152 for monitoring a smaller package. Similarly, the AOI generator 150 may generate a larger AOI 152 when the blindspot delivery detection 148 includes a lower confidence value for the estimated delivery location, and a smaller AOI 152 when the blindspot delivery detection 148 includes a higher confidence value for the estimated delivery locations.

The AOI 152 can include a virtual line crossing, or tripwire, in the camera field of view. In the example of FIG. 1, the blindspot delivery detection 148 indicates that the package 110 was delivered to the location 118. The location 118 is located to the southwest side of the porch 111, which corresponds to the right side of the porch 111 from the perspective of the camera 104. The where the virtual line crossing corresponds to the boundary 119.

The AOI generator 150 generates an AOI 152 that includes a virtual line crossing 130. The virtual line crossing 130 establishes a boundary around the estimated location of the package 110, such that a person in the field of view of the camera 104 would likely need to cross the virtual line crossing 130 in order to interfere with the package 110 at the location 118.

In some examples, the AOI generator 150 can generate the AOI 152 based on the scene model 144. For example, the AOI generator 150 may determine, based on the scene model 144, that the package 110 has been delivered to a location where there are few paths to approach the package 110. For example, the package 110 may be bounded on a first side by a wall of the property 102, on a second and third side by trees. Thus, the AOI generator 150 can determine that a person interfering with the package would likely approach from a fourth side that is accessible to the person. The AOI generator 150 can therefore generate the AOI 152 to detect a person approaching from the fourth side.

In another example, the AOI generator 150 may determine, based on the scene model 144, that the package 110 has been delivered to a location where there are many paths to approach the package 110. For example, the package 110 may be delivered to a location in the front yard that is occluded from the camera 104 by the shrub 122 and that is accessible from multiple directions of approach. The multiple directions can include, for example, approaching from a street 123, approaching from the walkway 125, and approaching from a neighboring yard to the left from the perspective of the camera 104.

In some cases, the AOI generator 150 can generate an AOI 152 that bounds the package from each of the multiple directions of approach. In some cases, the AOI generator 150 can generate an AOI 152 that bounds the package from the most likely direction or directions of approach. For example, based on the scene model 144, the AOI generator 150 may determine that the most likely direction of approach for an interferer is from a street 123. Therefore, the AOI generator 150 can generate an AOI that includes a boundary between the estimated package location and the street 123. In another example, based on the scene model 144, the AOI generator 150 may determine that the package 110 is most likely to be visible from the walkway 125, and therefore that the most likely direction of approach for an interferer is from the walkway 125. Therefore, the AOI generator 150 can generate an AOI 152 that includes a boundary between the estimated package location and the walkway 125. In some examples, the AOI generator 150 can determine a size and/or shape of the AOI 152 based on the likely directions of approach. For example, the AOI generator 150 may generate an AOI that has a first boundary between the street 123 and the estimated package location, and a second boundary between the walkway 125 and the estimated package location. The first boundary may be nearer to the estimated package location than the second boundary, based on the likelihood of approach from the walkway 125 being higher than the likelihood of approach from the street 123.

In some examples, the virtual line crossing 130 triggers a package interference detection event when an object crosses the virtual line crossing 130. In some examples, a package interference detection event is triggered when an object is detected on the same side of the virtual line crossing as the package. In some examples, a package interference is detected when an object is detected within a specified proximity to the virtual line crossing 130. For example, the virtual line crossing 130 may be positioned such that when an object traverses the virtual line crossing 130, the object is no longer within the field of view of the camera 104. The camera 104 can detect package interference based on the object approaching within a specified proximity to the virtual line crossing 130.

In some examples, the AOI 152 can include a path to the estimated location of the package. For example, a package may be delivered to a bottom of a staircase that is outside of the field of view of the camera. Based on the scene model 144, the AOI generator 150 may determine that in order to retrieve the package, a person would need to descend the staircase. Thus, the AOI generator 150 can generate an AOI 152 that includes a descending path along the length of the staircase towards the estimated delivery location. In some examples, the AOI generator 150 can generate an AOI 152 that includes a boundary at the top of the staircase, where the boundary extends the width of the staircase. Thus, a person will cross the boundary before descending the staircase, triggering an interference detection.

In some examples, in response to determining that a package was delivered to a blindspot of installed cameras, the camera 104 can set up one or more rules to monitor for actions that are associated with package tampering or package pickup. For example, the camera 104 can set up a rule that monitors for images of a person crouching, bending, or squatting near the estimated package location. In another example, the camera 104 can set up a rule that monitors for images of a person lingering near the estimated package location for a duration of time. For example, the camera 104 can set up a rule that monitors for a person remaining in the AOI 152 for at least a threshold duration of time.

The camera 104 can establish more strict rules when the property is in a higher traffic area in order to reduce the likelihood of false alarms, and can establish less strict rules when the property is in a lower traffic area. For example, in a lower traffic area, the camera 104 can set up a less strict rule that triggers a delivery interference detection when any person is detected within the AOI 152. In a higher traffic area, the camera 104 can set up a stricter rule that triggers a delivery interference detection when a person is detected within the AOI 152 for at least a threshold duration of five seconds.

In some examples, the camera 104 can adjust blindspot monitoring rules over time. For example, the camera 104 may receive feedback from the resident 116 indicating that a delivery interference notification was a false alarm. Based on the feedback, the camera 104 can adjust the rules to be stricter, in order to reduce the frequency of false alarms. In some examples, the camera 104 can adjust the rules based on analyzing captured image data over time. For example, the camera 104 may determine, based on image analysis performed over time, that an average of three people per hour pass through the AOI 152 and are within the AOI 152 for an average of two seconds. Thus, the camera 104 can establish a rule that triggers a delivery interference notification 156 when a person lingers within the AOI 152 for four seconds or greater.

In some examples, in response to determining that a package was delivered to a blindspot of installed cameras, the camera 104 can set up one or more temporary rules to increase a level of monitoring, e.g., by lowering thresholds for obtaining additional data or for generating notifications. For example, the camera 104 can set up a rule that causes the camera 104 to record video if the camera 104 captures images of any person entering or exiting the AOI 152. In another example, the camera 104 can set up a rule that causes the camera 104 to generate a notification if the camera 104 captures images of any person entering or exiting the AOI 152.

The AOI generator 150 and provides the AOI 152 to the blindspot monitor 154. The blindspot monitor 154 monitors the package while the package is located in the blindspot.

The blindspot monitor 154 can monitor and track the package 110 using the second set of images 136. For example, after delivery of the package 110, the camera 104 can continue to capture images. In some examples, the camera 104 continuously captures images. In some examples, the camera 104 captures images in response to detecting motion and/or detecting an object of interest.

The blindspot monitor 154 can monitor the second set of images 136 for depictions of people in the AOI and/or for people crossing over the virtual line crossing 130. For example, the second set of images 136 includes image 134. Image 134 shows a person 140 departing within the AOI defined by the virtual line crossing 130. The second set of images 136 may include images of the person 140 entering the AOI, exiting the AOI, or both.

In some examples, the blindspot monitor 154 can determine that delivery interference has occurred based on detecting the person 140 in the AOI. Delivery interference can include, for example, a non-resident person moving, removing, or damaging the package 110. In some examples, upon detecting the person 140 in the blindspot monitor 154 can perform additional analysis in order to determine whether delivery interference has occurred.

In some examples, the blindspot monitor 154 can perform additional analysis by performing facial recognition on the person 140. For example, the blindspot monitor 154 can determine whether any images of the second set of images includes a view of the person's face. The blindspot monitor 154 can then perform facial recognition in order to identify the person 140 and/or to determine whether the person 140 is a resident of the property 102. In some examples, in response to determining that the person 140 is within the AOI and is not a resident of the property 102, the blindspot monitor 154 can determine that delivery interference has occurred.

In some examples, the blindspot monitor 154 can perform additional analysis by analyzing images of the person 140 and/or a vehicle operated by the person 140. For example, person 140 may be a second delivery person who is delivering a second package. The blindspot monitor 154 can analyze the second set of images 136 to determine whether the person 140 is wearing a delivery uniform or is driving a delivery truck. Additionally, the blindspot monitor 154 can analyze the second set of images 136 to determine whether the person 140 approached the property 102 carrying a second package. In some examples, the blindspot monitor 154 can determine whether the approach of the person 140 corresponds to any expected deliveries, e.g., as specified by the delivery schedule data 165. Based on determining that the person 140 is a second delivery person delivering a second package, the blindspot monitor 154 may determine that no delivery interference has occurred.

In some examples, the blindspot monitor 154 can analyze the second set of images 136 to determine if the person 140 departs from the property 102 carrying the package 110. For example, the camera 104 can store an image of the package 110 if the package 110 was visible to the camera 104 in the first set of images 126. When the person 140 departs from the property 102, the camera 104 can compare a package in the second set of images 136 to the package 110 detected in the first set of images 126 to determine whether the person 140 has stolen the package 110.

The blindspot monitor 154 can analyze the second set of images 136 to determine whether the person 140 is a resident of the property or another person who is authorized to pick up the package 110. For example, the blindspot monitor 154 can perform facial recognition to determine whether the person 140 is a resident of the property 102.

In some examples, the blindspot monitor 154 can determine that the person 140 is a resident of the property 102 based on receiving data indicating a location of a mobile device of the resident, e.g., the mobile device 115 of the resident 116. For example, the camera 104 can determine the location of the mobile device 115 based on GPS data indicating the location of the mobile device 115 and/or based on communicating with the mobile device 115 via short range communication. The camera 104 can determine that the person 140 is the resident 116 based on comparing the location of the mobile device 115 with the location of the person 140. In some examples, the blindspot monitor 154 can determine that the person 140 is the resident 116 based on access controls, e.g., the person 140 entering an access code to a control panel of a system of the property 102.

In some examples, the blindspot monitor 154 can determine that the person 140 is the resident 116 based on receiving a confirmation of package pickup from the resident 116. For example, the resident 116 can submit, e.g., through an application of the mobile device 115, a confirmation that the resident 116 has picked up the package 110. In some examples, based on detecting the person 140 within the AOI 152, the blindspot monitor 154 can transmit, to the mobile device 115, a request for confirmation that an authorized person has picked up the package 110. The resident 116 can respond to the request by indicating "yes" an authorized person has picked up the package or "no" an authorized person has not picked up the package 110.

In some examples, the blindspot monitor 154 can determine whether package interference has occurred in part based on a path taken by the person 140. For example, based on the person 140 entering the AOI 152 and then approaching the door 103, the blindspot monitor 154 can determine that no delivery interference has occurred. In contrast, based on the person 140 entering the AOI 152 and then walking towards the street 123, the blindspot monitor 154 can determine that delivery interference has occurred.

In response to determining that the person 140 is a resident of the property 102 or another authorized person, the blindspot monitor 154 can determine that no delivery interference has occurred. The blindspot monitor 154 can cease performing blindspot monitoring when the blindspot monitor 154 determines that the package 110 has been picked up by a resident, has been moved into the field of view of the camera 104, and/or has been brought inside the property 102.

In some examples, the blindspot monitor 154 can determine that delivery interference is likely to occur, and can perform actions to prevent the delivery interference from occurring. For example, the second set of images can include images of the person 140 approaching the virtual line crossing 130. When the blindspot monitor 154 detects the person 140 crossing the virtual line crossing 130, the blindspot monitor 154 can transmit a command to a device at the property 102 to generate a warning for the person 140.

As an example, a light may be located near the porch 111. The blindspot monitor 154 can transmit a command to the light that causes the light to flash, as a warning for the person 140. In another example, an audio speaker may be located near the porch 111. The blindspot monitor 154 can transmit a command to the audio speaker that causes the audio speaker to broadcast sound. The sound can include, for example, an alarm sound or a voice that warns the person 140. In some examples, in response to determining that delivery interference is likely to occur, the blindspot monitor 154 can transmit a pre-emptive notification to the mobile device 115.

In some examples, the blindspot monitor 154 can determine that delivery interference is likely to occur or has occurred, and can adjust settings of the camera 104. For example, based on determining that delivery interference is likely to occur, the blindspot monitor 154 can increase a length of video clip captured by the camera 104 and/or can increase frequency of images captured by the camera 104.

In the example of FIG. 1, based on the second set of images 136 showing the person 140 in the AOI, the blindspot monitor 154 determines that delivery interference has occurred. The blindspot monitor 154 transmits a delivery interference notification 156. The delivery interference notification 156 can be transmitted to a computing device associated with a resident of the property 102, e.g., the mobile device 115 associated with the resident 116. The blindspot monitor 154 can send the delivery interference notification 156 to the mobile device 115, e.g., over a long-range data link. The delivery interference notification 156 can indicate that that package 110 has been interfered with.

In some examples, the blindspot monitor 154 can transmit a delivery interference notification 156 to more than one resident. For example, three residents may be associated with the property 102. The blindspot monitor 154 can transmit the delivery interference notification 156 to each of the three residents.

In some examples, the blindspot monitor 154 can determine, based on camera images showing the person 140 carrying the package 110, that the person 140 has stolen the package 110. The delivery interference notification 156 can therefore indicate to the resident 116 that the package 110 has likely been stolen.

In some examples, the delivery interference notification 156 can include prompts for the resident 116 to provide a confirmation that the package was picked up by a resident, or that the package was not picked up by a resident. For example, the delivery interference notification 156 can cause the mobile device 115 to display a user interface to the resident 116. The user interface can include selectable icons, e.g., a selectable icon indicating that "yes" the package was picked up by a resident or "no" the package was not picked up by a resident. After transmitting the delivery interference notification 156 to the resident, 116, the camera 104 can receive data indicating the resident's selection.

Though described above as being performed by a particular component of a system in the environment 100 (e.g., the camera 104 or the camera), and any of the various control, processing, and analysis operations can be performed by either the camera 104 or another component of the system. For example, the system may include a control unit at the property 102. The control unit may be configured to monitor and control various sensors and devices at the property 102. The control unit may communicate with the camera 104 and other sensors over a wireless network at the property 102. The control unit, the camera 104, or another computer system can analyze images to monitor deliveries at the property 102.

The system is an example of a system implemented as computer programs on one or more computers in one or more locations, in which the systems, components, and techniques described in this specification are implemented. The user devices including mobile device 115 and others not depicted in FIG. 1 can include personal computers, mobile communication devices, and other devices that can send and receive data over a network. The network (not shown), such as a local area network ("LAN"), wide area network ("WAN"), the Internet, or a combination thereof, connects the user devices including the mobile device 115, the camera 104, and the devices not depicted in FIG. 1. The system can use a single server computer or multiple server computers operating in conjunction with one another, including, for example, a set of remote computers deployed as a cloud computing service.

The system can include several different functional components, including a blindspot delivery detector 146, an AOI generator 150, and a blindspot monitor 154. The blindspot delivery detector 146, the AOI generator 150, or the blindpsot monitor 154, or a combination of these, can include one or more data processing apparatuses, can be implemented in code, or a combination of both. For instance, each of the blindspot delivery detector 146, an AOI generator 150, and a blindspot monitor 154 can include one or more data processors and instructions that cause the one or more data processors to perform the operations discussed herein.

The various functional components of the system can be installed on one or more computers as separate functional components or as different modules of a same functional component. For example, the components blindspot delivery detector 146, AOI generator 150, and blindspot monitor 154 of the system can be implemented as computer programs installed on one or more computers in one or more locations that are coupled to each through a network. In cloud-based systems for example, these components can be implemented by individual computing nodes of a distributed computing system.

Figure 2:
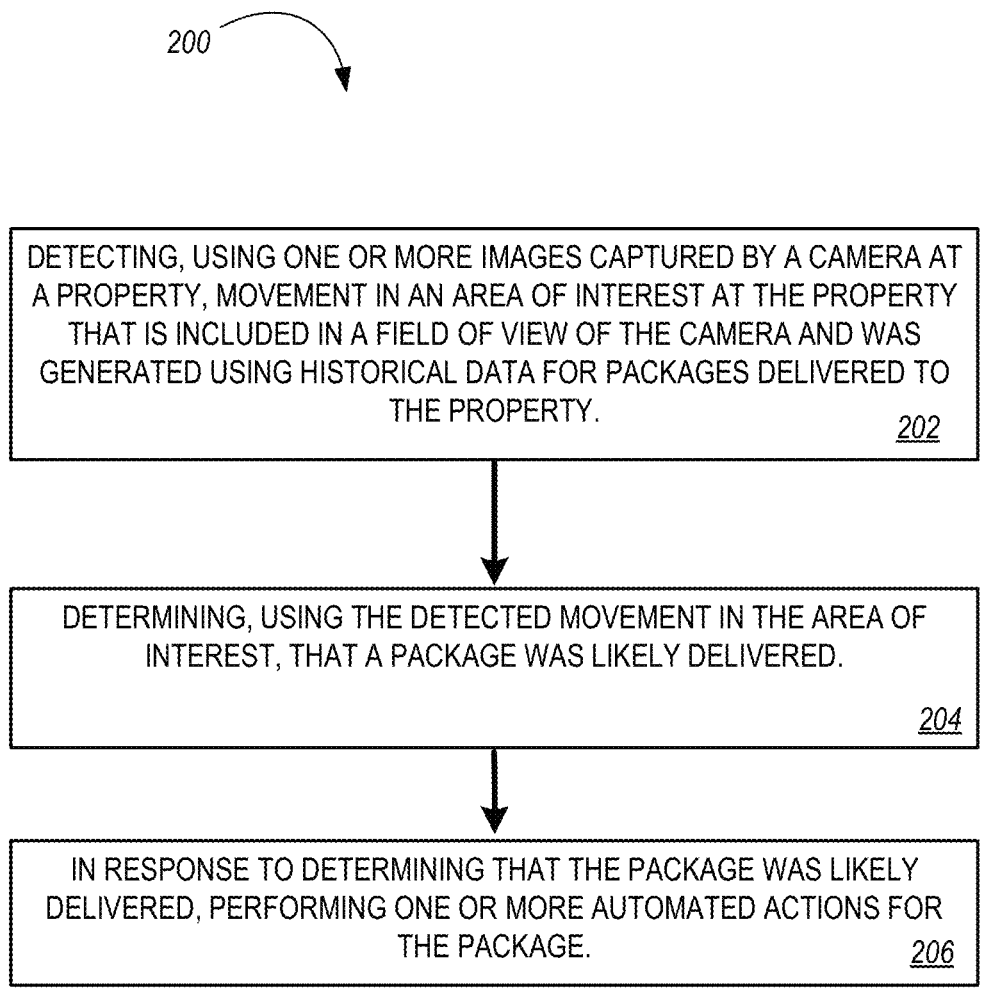
FIG. 2 is a flow diagram of an example process for monitoring packages delivered to camera blindspots.

FIG. 2 is a flow diagram of an example process 200 for monitoring packages delivered to camera blindspots. Briefly, the process 200 includes detecting, using one or more images captured by a camera at a property, movement in an area of interest at the property that is included in a field of view of the camera and was generated using historical data for packages delivered to the property (202), determining, using the detected movement in the area of interest, that a package was likely delivered (204), and in response to determining that the package was likely delivered, performing one or more automated actions for the package (206)

In additional detail, the process 200 includes detecting, using one or more images captured by a camera at a property, movement in an area of interest at the property that is included in a field of view of the camera and was generated using historical data for packages delivered to the property (202). For example, the blindspot delivery detector 146 can detect delivery of the package 110 to the location 118 that is outside of the field of view of the camera 104 at the property 102. The blindspot delivery detector 146 can detect the package delivery to the location 118 based on analyzing the first set of images 126 that show the delivery person 114 following path 113. The blindspot delivery detector can compare the first set of images 126 to the scene model 144 and to historical delivery database 162 to determine that the package 110 was likely delivered to the location 118.

In some examples, the process 200 can detect the movement using data other than image data, e.g., alone or in conjunction with the use of image data. For instance, the blindspot delivery detector 146 can use motion sensor data, near field communication data from a delivery person's device, weight sensor data for a weight sensor at the location outside the camera 104's field of view, other appropriate sensor data, or a combination of two or more of these to detect delivery of the package 110.

The process 200 can include, generating an area of interest in the camera field of view. The process 200 can perform the generation in response to detecting the package delivery to the location that is outside the camera field of view. For example, based on the blindspot delivery detection 148 indicating package delivery to the location 118, the AOI generator 150 can generate the AOI 152. The AOI 152 is defined by virtual line crossing 130 in the field of view of the camera 104.

The process 200 can include monitoring the area of interest using camera images captured by the camera. For example, the blindspot monitor 154 can monitor the area of interest bounded by the virtual line crossing 130 using the second set of images 136. The blindspot monitor 154 can monitor activity inside the area of interest as well as objects crossing in to or out of the area of interest.

The process 200 includes determining, using the detected movement in the area of interest, that a package was likely delivered (204). For example, the blindspot monitor 154 can determine that package delivery interference has occurred based on detecting, in the second set of images 136, the person 140 inside the area of interest. In some examples, the blindspot monitor 154 can determine that the package delivery interference has occurred based on determining that the person 140 is not a resident of the property 102 and is not a delivery person.

The process 200 includes, in response to determining that the package was likely delivered, performing one or more automated actions for the package (206). For example, based on determining that package delivery interference has occurred, the blindspot monitor 154 can provide the delivery interference notification 156 to the mobile device 115 for presentation to the resident 116.

Figure 3:
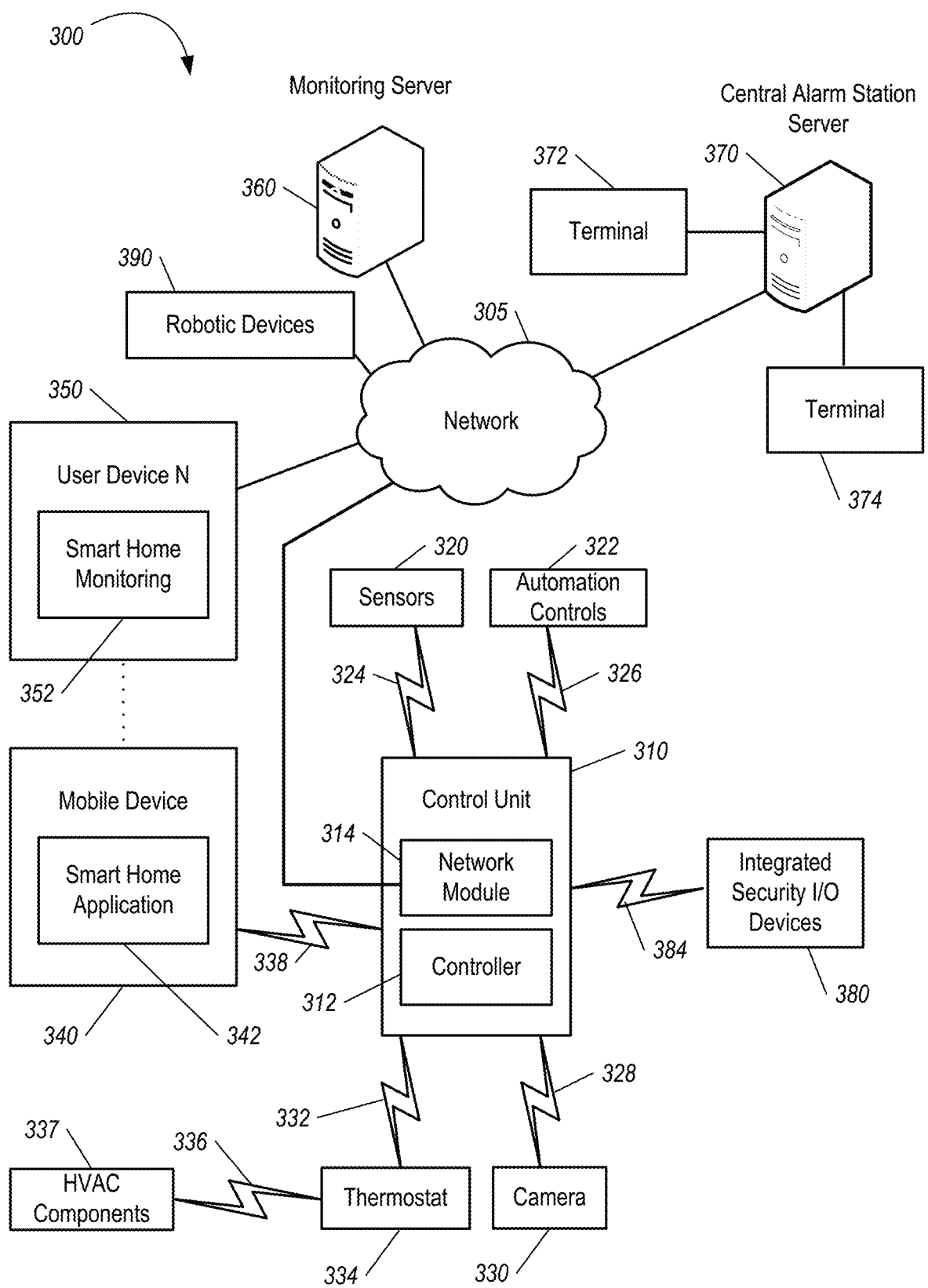
FIG. 3 is a diagram illustrating an example of a monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may be capable of moving throughout a home based on automated control technology and/or user input control provided by a user. In this example, the robots may be able to fly, roll, walk, or otherwise move about the home. The robots may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300. For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
   determining that a first package was delivered to a location not depicted in one or more first images captured by a camera at a property;
   in response to determining that the first package was likely delivered to the location not depicted in the one or more first images captured by the camera at the property, generating an area of interest in a field of view of the camera;
   detecting, using one or more second images captured by the camera at the property, movement in the area of interest i) at the property, ii) that is included in the field of view of the camera and iii) was generated using historical data for packages delivered to the property;
   determining, using the detected movement in the area of interest and the one or more second images captured by the camera, that a package was likely delivered; and
   in response to determining that the package was likely delivered, performing one or more automated actions for the package.

2. The method of claim 1, wherein the location not depicted in the one or more second images captured by the camera comprises a location outside the field of view of the camera or an occluded location behind one or more objects depicted in at least the one or more second images captured by the camera.

3. The method of claim 1, wherein performing the one or more automated actions for the package comprises, in response to determining that the package was likely delivered, providing, to a device for an occupant of the property, instructions to cause the device to present a notification about the package.

4. The method of claim 1, wherein performing the one or more automated actions for the package comprises, in response to determining that the package was likely delivered, sending, to the camera, instructions to cause the camera to capture, using a second field of view, one or more third images that depict a location at which the package was likely delivered.

5. The method of claim 1, wherein performing the one or more automated actions for the package comprises:

detecting, using one or more third images captured by the camera, second movement in the area of interest; and in response to determining that the package was likely delivered and detecting the second movement in the area of interest, causing presentation of a warning.

6. The method of claim 1, wherein:

detecting the movement in the area of interest comprises detecting, using one or more third images captured by the camera that depict the package, the movement in the area of interest; and determining, using the detected movement in the area of interest, that the package was likely delivered comprises determining, using the one or more third images from which the movement in the area of interest was detected and one or more fourth images a) captured by the camera after the one or more third images b) that do not depict the package, that the package was likely delivered.

7. The method of claim 1, wherein detecting the movement in the area of interest comprises detecting, using the one or more second images captured by the camera, the movement of a person or a robot in the area of interest.

8. The method of claim 1, wherein detecting the movement in the area of interest comprises detecting, using the one or more second images captured by the camera, the movement in the area of interest around an area at which the historical data indicates one or more packages were previously delivered.

9. A system comprising one or more computers and one or more storage devices on which are stored instructions that are operable, when executed by the one or more computers, to cause the one or more computers to perform operations comprising:

determining that a first package was delivered to a location not depicted in one or more first images captured by a camera at a property;

in response to determining that the first package was likely delivered to the location not depicted in the one or more first images captured by the camera at the property, generating an area of interest in a field of view of the camera;

detecting, using one or more second images captured by the camera at the property, movement in the area of interest i) at the property, ii) that is included in the field of view of the camera and iii) was generated using historical data for packages delivered to the property;

determining, using the detected movement in the area of interest and the one or more second images captured by the camera, that a package was likely delivered; and in response to determining that the package was likely delivered, performing one or more automated actions for the package.

10. The system of claim 9, wherein the location not depicted in the one or more second images captured by the camera comprises a location outside the field of view of the camera or an occluded location behind one or more objects depicted in at least the one or more second images captured by the camera.

11. The system of claim 9, wherein performing the one or more automated actions for the package comprises, in response to determining that the package was likely delivered, providing, to a device for an occupant of the property, instructions to cause the device to present a notification about the package.

12. The system of claim 9, wherein performing the one or more automated actions for the package comprises:

detecting, using one or more third images captured by the camera, second movement in the area of interest; and in response to determining that the package was likely delivered and detecting the second movement in the area of interest, causing presentation of a warning.

13. The system of claim 9, wherein:

detecting the movement in the area of interest comprises detecting, using one or more third images captured by the camera that depict the package, the movement in the area of interest; and determining, using the detected movement in the area of interest, that the package was likely delivered comprises determining, using the one or more third images from which the movement in the area of interest was detected and one or more fourth images a) captured by the camera after the one or more third images b) that do not depict the package, that the package was likely delivered.

14. The system of claim 9, wherein detecting the movement in the area of interest comprises detecting, using the one or more second images captured by the camera, the movement in the area of interest around an area at which the historical data indicates one or more packages were previously delivered.

15. A non-transitory computer storage medium encoded with instructions that, when executed by one or more computers, cause the one or more computers to perform operations comprising:

determining that a first package was delivered to a location not depicted in one or more first images captured by a camera at a property;

in response to determining that the first package was likely delivered to the location not depicted in the one or more first images captured by the camera at the property, generating an area of interest in a field of view of the camera;

detecting, using one or more second images captured by the camera at the property, movement in the area of interest i) at the property, ii) that is included in the field of view of the camera and iii) was generated using historical data for packages delivered to the property;

determining, using the detected movement in the area of interest and the one or more second images captured by the camera, that a package was likely delivered; and in response to determining that the package was likely delivered, performing one or more automated actions for the package.

16. The computer storage medium of claim 15, wherein the location not depicted in the one or more second images captured by the camera comprises a location outside the field of view of the camera or an occluded location behind one or more objects depicted in at least the one or more second images captured by the camera.

17. The computer storage medium of claim 15, wherein performing the one or more automated actions for the package comprises, in response to determining that the package was likely delivered, providing, to a device for an occupant of the property, instructions to cause the device to present a notification about the package.

18. The computer storage medium of claim 15, wherein performing the one or more automated actions for the package comprises:

detecting, using one or more third images captured by the camera, second movement in the area of interest; and in response to determining that the package was likely delivered and detecting the second movement in the area of interest, causing presentation of a warning.

19. The computer storage medium of claim 15, wherein:
detecting the movement in the area of interest comprises detecting, using one or more third images captured by the camera that depict the package, the movement in the area of interest; and
determining, using the detected movement in the area of interest, that the package was likely delivered comprises determining, using the one or more third images from which the movement in the area of interest was detected and one or more fourth images a) captured by the camera after the one or more third images b) that do not depict the package, that the package was likely delivered.

20. The computer storage medium of claim 15, wherein detecting the movement in the area of interest comprises detecting, using the one or more second images captured by the camera, the movement in the area of interest around an area at which the historical data indicates one or more packages were previously delivered.

* * * * *